J. CREAMER.
Mole-Plow Capstan.
No. 62,116.  Patented Feb. 19, 1867.
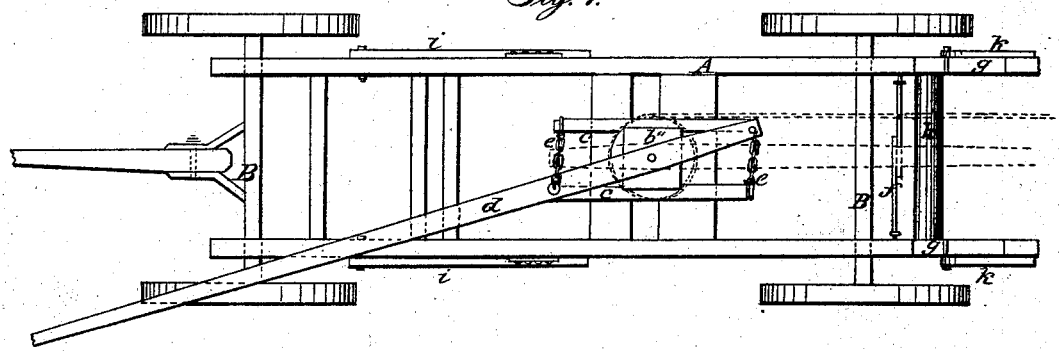
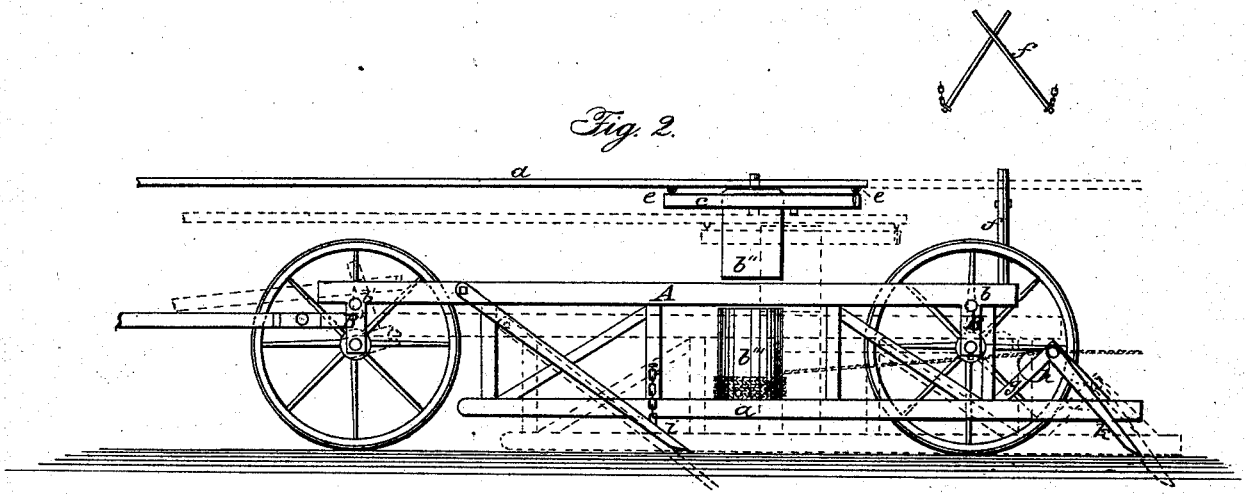
Witnesses:
A. Kirkpatrick
J. H. Lerow
Inventor:
J. Creamer

United States Patent Office.

JACOB CREAMER, OF JEFFERSONVILLE, OHIO.

*Letters Patent No. 62,116, dated February 19, 1867.*

IMPROVEMENT IN MOLE PLOUGHS.

*The Schedule referred to in these Letters Patent and making part of the same.*

TO ALL WHOM IT MAY CONCERN:

Be it known that I, JACOB CREAMER, of Jeffersonville, Fayette county, State of Ohio, have invented a new and useful Improvement in Portable Capstans for Mole Ploughs, of which the following is a full and clear description thereof, reference being had to the accompanying drawing, forming part of this specification.

Figure 1 is a plan of my improved portable capstan.

Figure 2 is an elevation of my improved portable capstan, the near wheels being removed.

A indicates the frame of the machine, which is supported upon rotating axle-trees, B B', at its rear and front ends. The upper parts of the axle-trees are provided with circular bearings, $b\ b'$, which rest in sockets or boxes in the frame A. From the lower part of the axle-trees project the gudgeons upon which the wheels revolve. $a$ is the rail of the frame nearest the ground. Conveniently situated near the centre of the frame is a vertical drum, $b'''$, to which is secured, immediately above the frame, the square capstan-head $b''$. Two parallel bars, $c$, are mortised into the upper end of the capstan-head $b''$. Upon the capstan-head $b''$ is pivoted the sweep $d$, which is secured to parallel bars $c$ by chains $e$. To the rear end of the upper rails of the frame A is attached, by means of chains or any flexible material, the horse $f$. Upon the rear end of rails $a$ are standards, $g$, which sustain the revolving drum $h$. Near the forward ends of the frame A, and to the upper rail, are pivoted the retaining bars $i$. A retaining rail or bar, $k$, smaller than bar $i$, is pivoted to the apex of each standard $g$. Having determined the direction the mole plough is to take, the portable capstan is placed in position, the frame A is depressed until the lower rail $a$ rests upon the ground, and the extreme points of retaining bars $i$ and $k$ are placed in the ground. The power applied to sweep $d$ coils up the rope upon drum $b$. To this rope is attached the plough. As the strain increases, the retaining-bars $i$ and $k$ are forced deeper into the ground, thus securing permanently in position the capstan until the plough is drawn up to the machine. The frame of the machine is then rotated upon its axle-trees and the lower rail $a$ elevated above and free from the ground, and the retaining-bars $i$ and $k$ raised up and secured by chains or cords until the machine is in its next position. In this manner the capstan is advanced and secured in position, and the plough drawn after it. When the machine is not in use the sweep $d$ may rest in the fork of horse $f$.

I do not claim broadly for supporting a capstan upon an adjustable frame attached to the axle of a carriage nor upon the use of the retaining-bars $i$, for I am aware that machines containing these features have already been patented. But my improvement consists in forming the frame A with parallel timbers, and attaching it directly to the bent axles B B', upon which it swings in the arc of a circle, resting, when down, upon the entire length of the ground-sill $a$, so as to bring the drag rope parallel with and near to the ground, and in bringing the retaining-bars $i$ and $k$ to the frame in such a manner as to simplify and cheapen the construction of the machine.

Having described my invention, and the use of its various parts, I make the following claims:

1. The combination of the rectangular frame A, bent axles B B' and hinged retaining-bars $i$ and $k$, the said parts being respectively constructed and arranged for use substantially in the manner and for the purpose set forth.

2. The arrangement of the swinging frame A, capstan $b'''$, capstan-head $b''$, parallel bars $c$, chains $e$, lever $d$, and "horse" $f$, substantially as set forth.

JACOB CREAMER.

Witnesses:
A. KIRKPATRICK,
CHAS. L. DOEGEN.